United States Patent [19]
Baghdasarian

[11] Patent Number: 5,864,320
[45] Date of Patent: Jan. 26, 1999

[54] SYNCHRONOUS ROTATION DUAL-AXIS MECHANICAL HINGE ASSEMBLIES

[75] Inventor: Varouj G. Baghdasarian, Cupertino, Calif.

[73] Assignee: Space Systems/Loral, Inc., Palo Alto, Calif.

[21] Appl. No.: 689,284

[22] Filed: Aug. 6, 1996

[51] Int. Cl.$^6$ .............................. H01Q 3/00; H01Q 3/02
[52] U.S. Cl. ..................... 343/757; 343/758; 343/882; 16/335; 248/665
[58] Field of Search .................................. 343/915, 757, 343/758, 763, 765, 880, 881, 882, DIG. 1, DIG. 2; 16/367, 285, 335, 308; 248/664, 665, 666, 669, 667

[56] References Cited

U.S. PATENT DOCUMENTS

| | | | |
|---|---|---|---|
| 3,530,477 | 9/1970 | Jarrett et al. | 343/765 |
| 4,926,181 | 5/1990 | Stumn | 343/915 |

FOREIGN PATENT DOCUMENTS

| | | | |
|---|---|---|---|
| 2562724 | 10/1985 | France | 343/915 |
| 58-101506 | 6/1983 | Japan | 343/DIG. 1 |

*Primary Examiner*—Hoanganh T. Le
*Attorney, Agent, or Firm*—Perman & Green, LLP

[57] ABSTRACT

Dual-axis hinge assemblies comprising mechanical devices which provide integrated synchronous rotation of a support element, such as a space antenna shaft, attached to a vertical hinge shaft about its own axis while simultaneously pivoting the support shaft about a horizontal hinge shaft having a second axis which extends in a direction perpendicular to the axis of the vertical hinge shaft. The hinge assembly is adapted to be mounted parallel to a side surface of a spacecraft body and restrained by a holddown device, and is biased to cause the space antenna to pivot on the horizontal hinge shaft from restrained position to deployed position and to simultaneously turn on its own axis about a vertical hinge shaft when the restraint is removed, to aim the antenna reflector disk in a predetermined direction.

7 Claims, 2 Drawing Sheets

SYNCHRONOUS ROTATION DUAL-AXIS MECHANICAL HINGE ASSEMBLIES

FIELD OF THE INVENTION

The invention relates generally to mechanical hinge assemblies, such as for satellite reflectors of the type launched into space enclosed within a vehicle housing or fairing and deployable therefrom to be sustained in space, typically about Earth's orbit or for deep space probe applications, for reflecting electromagnetic signals.

BACKGROUND OF THE INVENTION

High-gain antenna reflectors have been deployed into space from launch vehicles for several decades. The configurations of such reflectors have varied widely as material science developed and as the sophistication of technology and scientific needs increased.

Large diameter antenna reflectors pose particular problems both during deployment and post-deployment. Doubly-curved, rigid surfaces which are sturdy when in a deployed position cannot be folded for storage. Often, reflectors are stored one to two years in a folded, stored position prior to deployment. In an attempt to meet this imposed combination of parameters, large reflectors have been segmented into petals so that these petals could be stowed in various overlapped configurations. However, the structure required in deploying such petals has tended to be rather complex and massive, thus reducing the feasibility of such structures. For this reason, parabolic antenna reflecting surfaces larger than those that can be designed with petals typically employ some form of a compliant structure. Reference is made to U.S. Pat. 4,899,167, for its disclosure of such a system.

Responsive to the need for such a compliant structure, rib and mesh designs have been built, tested and used. However, such antennas tend to suffer from chording in both radial and circumferential directions. The use of mesh in such a configuration has an inherent disadvantage in diminishing the reflective quality of the resulting parabolic surface. Further, a mesh cannot be made to form a truly parabolic configuration. Reference is made to U.S. Pat. 3,707,720 for its disclosure of such a system.

Other antenna designs typically include a center post about which the petals are configured, much like an umbrella configuration. This also affects the reflective quality of the resulting surface, since the center portion typically is the point of optimum reflectance, which is then blocked by the center post. Thus, it is desirable to have a structure that is deployable from a compact, stored position to a parabolic, open position without the use of a center post. Reference is made to U.S. Pat. Nos. 3,286,270; 3,397,399 and 3,715,760 which disclose such systems.

Large lightweight flexible antennas have been formed from graphite fiber-reinforced plastic composite fabrics which can be wrapped around a spacecraft body into compact form, launched and caused to unfold relative to the spacecraft body to provide a satellite body having large reflective antennas.

For example, space satellites require antennas for signal reception and/or transmission. Such satellites and antennas must be relatively lightweight, strong, capable of being folded into compact condition, and capable of being activated remotely into unfolded, deployed condition in which they are operational for their intended purposes. It is generally desirable to use flexible antenna reflectors which are hingedly attached to the supporting spacecraft platform so that they can be folded up against the sides of the spacecraft into compact storage position during the launching of the spacecraft, and can be actuated remotely for unfolding and deployment into operating position in space. Such deployment may involve rotating the antenna supports on a hinge axis to unfold the reflectors to a position in which they extend perpendicular to the sides of the spacecraft, and also rotating the reflectors about a second axis, perpendicular to the first axis, to aim the reflectors in the direction of the signal source or target.

It is known to provide satellites with independent motorized units having complex gearing in order to accomplish remote orientation of their antennas about two different axes during deployment. Such motorized units are relatively heavy, subject to failure, expensive and less reliable than mechanical hinges. Therefore it is the principal object of the present invention to provide a simplified dual-axis hinge assembly which overcomes the problems of prior-known motor-driven dual axis hinge assemblies, particularly for space satellite use.

There is a need for relatively simple, lightweight, mechanical hinge assemblies having two integrated axes of rotation which co-operate to rotate and extend a supported element, such as a space antenna, to a desired radial position about a first axis while simultaneously rotating the supported element to a desired position about a second axis which extends perpendicular to the first axis to aim the reflector in a desired direction.

SUMMARY OF THE INVENTION

The novel dual-axis hinge assemblies of the present invention are mechanical devices which provide integrated synchronous rotation of a support element, such as a space antenna shaft, about its own axis while simultaneously pivoting the support shaft about a hinge shaft having a second axis which extends in a direction perpendicular to the axis of the support shaft and is adapted to be mounted parallel to a side surface of a spacecraft body to which the hinge assembly is to be attached.

The present hinge assemblies are mechanically biased towards deployed condition, such as by means of one or more springs, and must be urged and restrained into compact storage condition for reception of the supported element, such as by means of conventional holddown devices mounted on the satellite. Once the satellite is ejected from the launching vehicle in space, and upon proper ground command, the antenna holddowns are released allowing the hinge springs to rotate and deploy each antenna to deployed position in which it extends at a desired angle, such as up to 90°, relative to the surface of the spacecraft. The pivoting movement or rotation of the antenna support shaft about the hinge shaft simultaneously produces rotation of the support shaft about its own axis to a predetermined extent whereby the face of the antenna reflector is caused to be aimed in a desired direction, corresponding to the direction of signals to be received and/or transmitted by the space antenna. For example, the extent of pivot rotation about the first axis or hinge axis may be limited to about 90°, producing simultaneous shaft rotation about its own axis to any desired position, such as about 45°, to cause the reflector to face in a predetermined direction.

According to one embodiment of the present invention, the reflector shaft is fixed to a gear segment having teeth which are integrated with the teeth of a gear segment fixed to the hinge support, so that the reflector shaft is rotated while it is pivoted on the hinge axis.

According to a second embodiment, the reflector shaft is loosely-linked tangentially to the hinge support to produce rotation of the reflector shaft while the reflector shaft is pivoted on the hinge axis.

THE DRAWINGS

DETAILED DESCRIPTION

Figure 1:
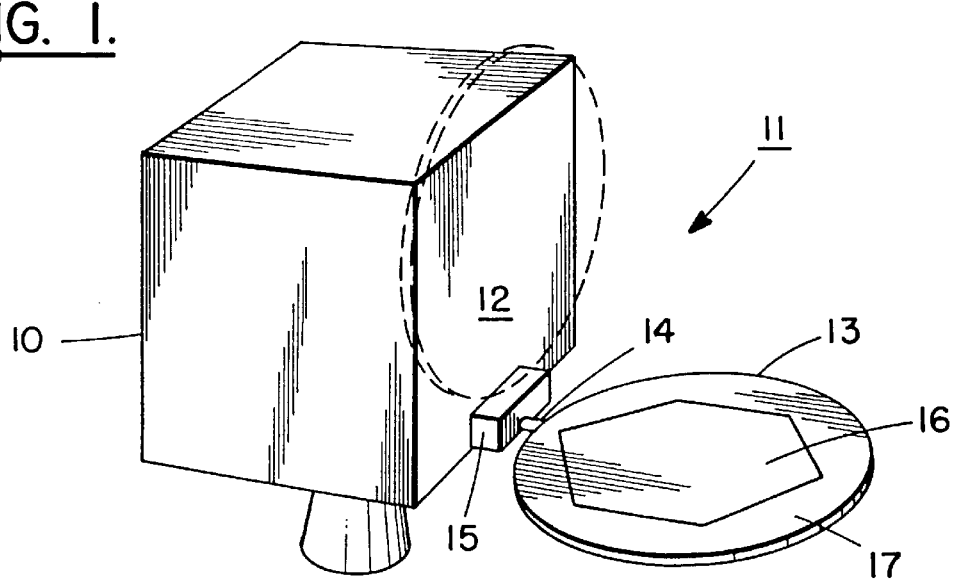
FIG. 1 is a perspective view of a space satellite having hingedly-attached thereto an antenna reflector deployed from compact folded position, shown by means of broken lines.

Referring to FIG. 1, a space satellite 10 is illustrated with a single antenna-supporting hinge assembly 11 attached to one side surface 12 thereof, the assembly 11 comprising an antenna reflector 13, support shaft 14 and hinge 15. The assembly is illustrated in deployed or open position, rotated on the hinge axis down from folded or compact position parallel to and against the satellite surface 12, illustrated by means of broken lines.

The antenna reflector 13 may comprise a rigid support structure 16, fixed to the shaft 14, and a flexible composite reflector membrane 17 capable of flexing or bending around the satellite body when the assembly 11 is forced into compact position and inserted into a space launch vehicle for delivery into a desired orbit. After ejection of the satellite into space orbit, and release of the antenna holddowns by ground command, the hinge assembly 11 automatically moves the reflector 13 into open position while simultaneously rotating the support shaft 14 to face the reflector 13 in a predetermined desired signal direction.

Figure 2:
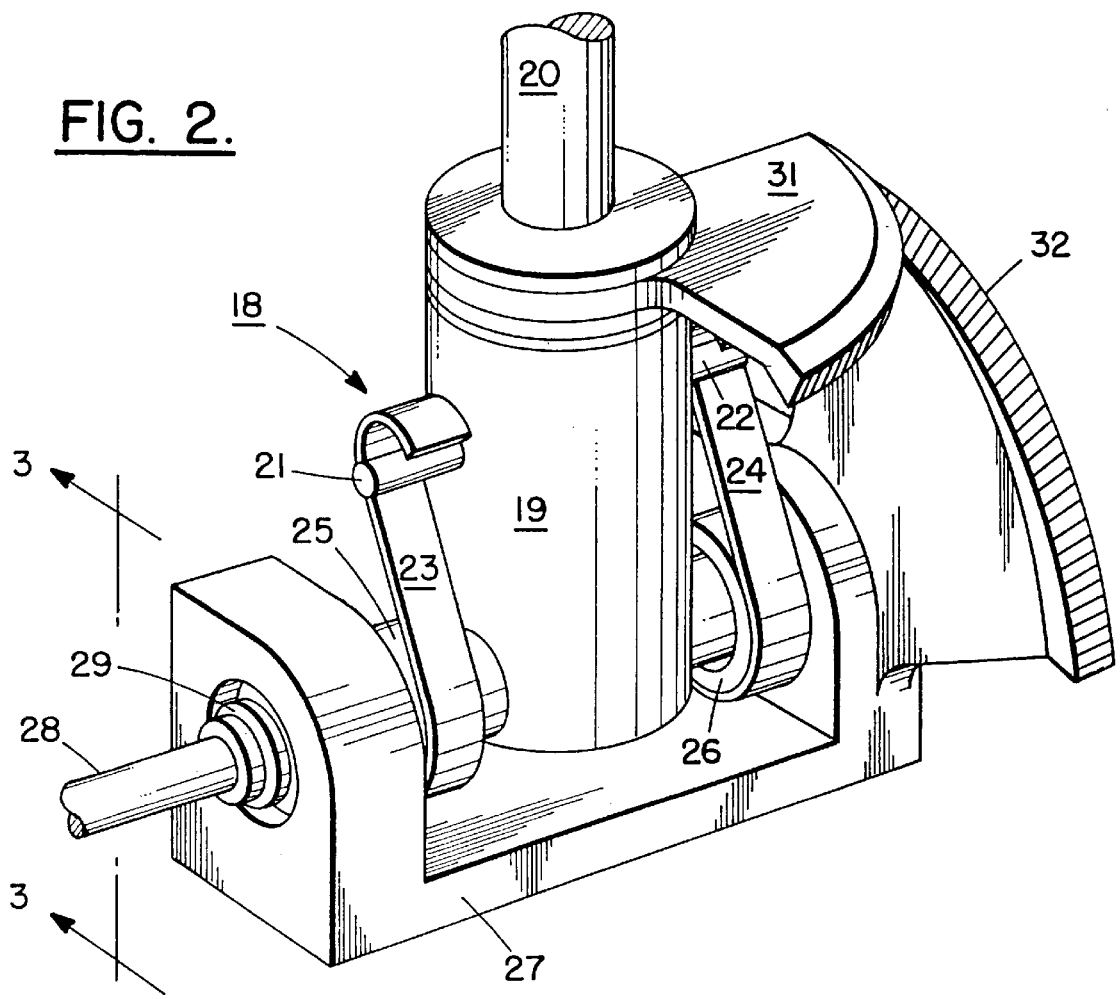
FIG. 2 is a perspective view of a two-axis antenna support hinge according to one embodiment of the present invention.
Figure 3:
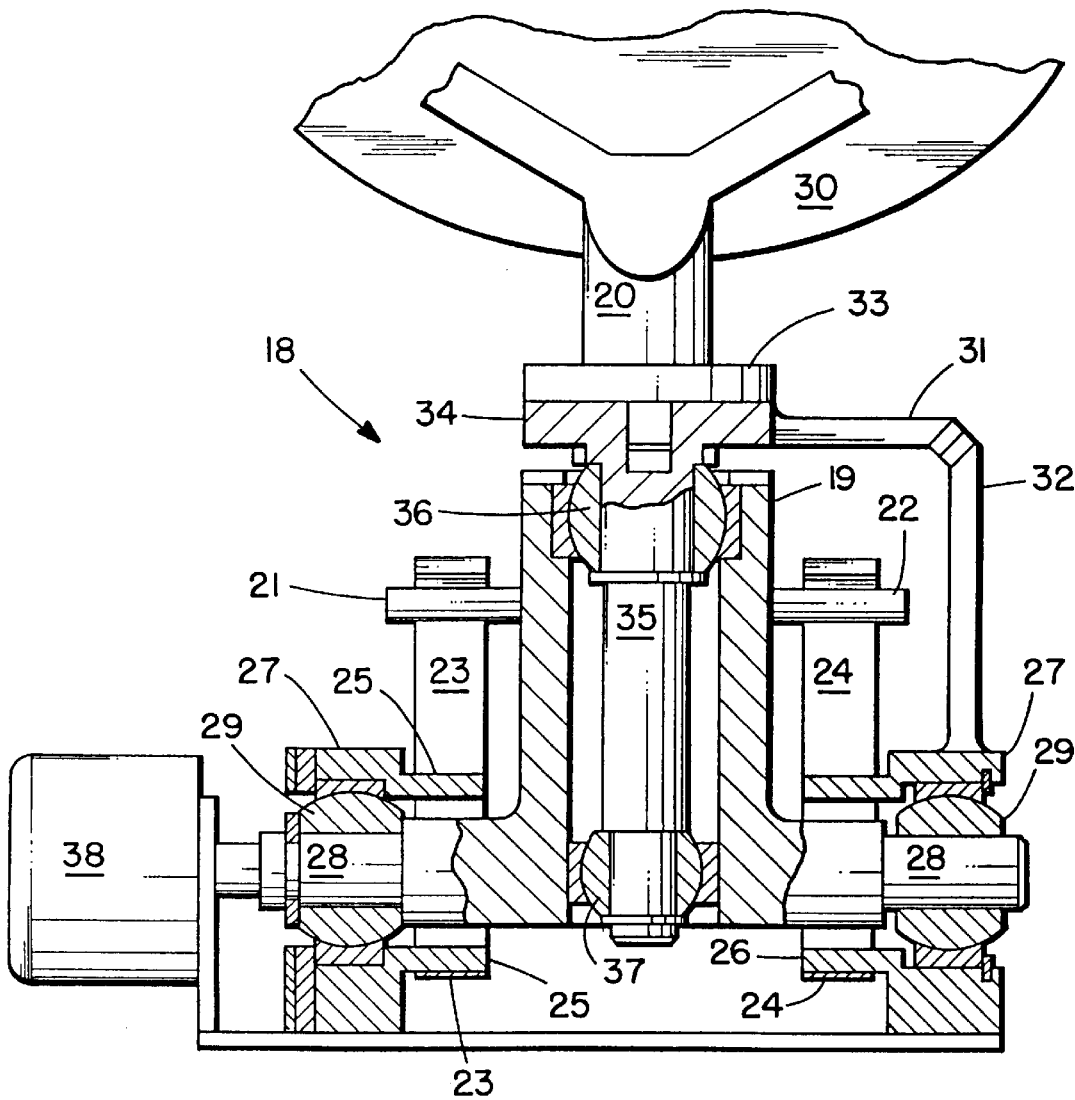
FIG. 3 is a view of the antenna support hinge of FIG. 2 taken along the line 3—3 thereof.

The hinge assembly 18 of FIGS. 2 and 3 comprises one embodiment of the present invention and illustrates the assembly restrained into compact position in which the T-shaped bearing housing 19 for the antenna support shaft extension 20 is rotated into vertical position with its pins or studs 21 and 22 forcing the deployment springs, 23 and 24 respectively, under tension to bias the bearing housing 19 to return to horizontal or deployed position when the restraining force is relaxed. The ends of the springs 23 and 24 are attached to flanged hubs 25 and 26 integral with the U-shaped hinge housing 27 having opposed walls with bores for the journal ends of the horizontal hinge shaft 28 and its bearings 29. In the T-shaped bearing housing assembly, the horizontal cross-member of the T-shape comprises the integral hinge shaft 28, and the perpendicular member of the T-shape comprises the bearing housing 19 containing a vertical or perpendicular hinge shaft 35, shown in FIG. 3.

In the embodiment of FIGS. 2 and 3, the automatic simultaneous rotation of the antenna support shaft extension 20, and of the antenna reflector 30 which is integral therewith, is produced by the intermeshing of horizontal bevel gear segment 31 with vertical bevel gear 32 as the T-shaped hinge bearing housing assembly is rotated on its cross-member, horizontal the hinge shaft 28, from vertical position down to deployed position by the force of the springs 23 and 24 when the restraint thereon is released. As shown most clearly by FIG. 3, the antenna shaft extension 20 comprises a lower flange 33 which is fixed to an upper flange 34 which is integral with the vertical hinge shaft 35. The bevel gear segment 31 is integral with or brazed to the shaft flange 34, and the shaft 35 is rotatably mounted within the bearing housing 19 by means of upper and lower bearings, 36 and 37 respectively. A damper means 38 is attached to the hinge shaft 28 to cushion the movement of the antenna reflector assembly down into deployed position, and the degree or extent of rotation of the antenna reflector assembly can be controlled by adjusting the relative position of the bevel gear segment 31, or its circumferential length, and/or by the use of a stop means to limit the extent of rotation of the horizontal hinge shaft 28, thereby limiting the extent of rotation of the vertical hinge shaft 35.

Figure 4:
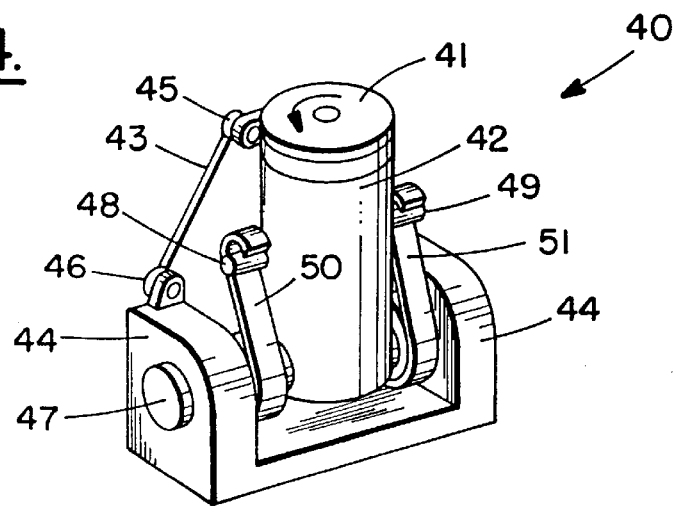
FIG. 4 is a perspective view of a two axis antenna support hinge according to another embodiment of the present invention.

In the embodiment of FIG. 4, the hinge assembly 40 has the reflector 30, and its shaft 20, as shown in FIG. 3, fixed to a flange 41 integral with an antenna reflector shaft rotatably-supported within a T-shaped shaft bearing housing assembly 42, similar to the attachment of flange 33 to shaft 35 which is rotatably-supported by bearings 36 and 37 within the housing 19 of FIG. 3.

The essential difference between the embodiments of FIGS. 3 and 4 is the replacement of the mating bevel gears 31 and 32 with a link 43 which is loosely connected to a peripheral area of the reflector-supporting flange 41 and to one of the opposed walls of the U-shaped hinge support housing 44, such as by means of eyelets or ball joints 45 and 46. The journal ends of the hinge shaft 47 are rotatably supported by the opposed walls of the hinge support housing 44 within opposed bores and bearings similar to bearings 29 of FIG. 3, and the shaft bearing housing assembly 42 is shown restrained in folded or vertical position in FIG. 4, with its pins or studs 48 and 49 forcing the deployment springs 50 and 51, respectively, under tension to bias the housing assembly 42 to return to horizontal or deployed position when the restraining force is relaxed.

As the T-shaped shaft housing assembly 42 pivots on the journal ends of the hinge shaft 47 from vertical to horizontal position, or some predetermined position intermediate thereof, the connecting link 43 causes the flange 41 supporting the reflector and its shaft to be rotated a predetermined angle or distance simultaneously with the pivot of the housing assembly 42 on the hinge shaft 47. The connecting eyelet or ball joint 45 on the antenna shaft flange 41 is positioned behind or upstream of the axis of rotation of the hinge shaft 47 and of the location of the connecting eyelet or ball joint 46 on the hinge housing 44. This connection causes the link 43 to control the extent of rotation of the flange 41, and the reflector supported thereby, without limiting the rotation of the housing assembly 42 on the hinge shaft 47.

It will be apparent to those skilled in the art that other mechanical means may be employed to integrate the rotation of the antenna reflector shaft on its axis with the rotation of the hinge shaft on its axis, perpendicular to the axis of rotation of the reflector shaft, to produce automatic simultaneous rotation without the need for motors or other electrical power means.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed:

1. A synchronous rotation dual-axis mechanical hinge assembly comprising a U-shaped hinge support member having opposed walls with bores for rotatably-supporting the opposed ends of a horizontal support shaft; a T-shaped bearing housing comprising a horizontal bearing housing section supporting a horizontal hinge shaft, and a perpendicular bearing housing section perpendicular to said horizontal bearing housing section and supporting a perpendicular hinge shaft for rotation about an axis which is perpendicular to the axis of rotation of said horizontal hinge shaft, said perpendicular hinge shaft supporting a flange member which extends outwardly of said perpendicular bearing housing section; biasing means between said perpendicular bearing housing section and said U-shaped hinge support member for biasing said perpendicular bearing housing section for rotation in one direction on said horizontal hinge shaft, from restrained position into deployed position, and means connecting the flange member of said perpendicular hinge shaft to said U-shaped hinge support member to produce a simultaneous automatic rotation of said flange member and said perpendicular hinge shaft along its axis of rotation when the horizontal bearing housing section is rotated on the horizontal hinge shaft member along its axis of rotation, perpendicular to the axis of rotation of said perpendicular hinge shaft, from restrained position into deployed position.

2. The hinge assembly according to claim 1 in which the flange member of the perpendicular hinge shaft comprises a rotatable gear means which engages a fixed gear on said U-shaped hinge support member to produce said simultaneous automatic rotation of the perpendicular hinge shaft on its axis to a predetermined extent when the horizontal bearing housing section is rotated on the horizontal hinge shaft axis.

3. The hinge assembly according to claim 1 in which the flange member of the perpendicular hinge shaft comprises a flexible linkage means to the U-shaped hinge support member to cause the flange member and perpendicular hinge shaft to rotate on its axis to a predetermined extent when the horizontal bearing housing section is rotated on the horizontal hinge shaft axis.

4. The hinge assembly according to claim 1 in which the flange member of the perpendicular hinge shaft supports a satellite antenna reflector for rotation with said perpendicular hinge shaft to aim said reflector in a predetermined desired direction simultaneously with rotation of said horizontal hinge shaft to deployed position.

5. The hinge assembly according to claim 1 further comprising a damper means associated with said horizontal hinge shaft for controlling the rotational speed thereof to deployed position.

6. The hinge assembly according to claim 1 in which said biasing means comprise spring means.

7. The hinge assembly according to claim 6 in which said spring means comprise coil spring means, one end of which is attached to said hinge support member and the other end of which engages said perpendicular bearing housing section.

* * * * *